United States Patent
Gould et al.

(10) Patent No.: US 6,331,852 B1
(45) Date of Patent: Dec. 18, 2001

(54) METHOD AND APPARATUS FOR PROVIDING A THREE DIMENSIONAL OBJECT ON LIVE VIDEO

(75) Inventors: David Allen Gould, Reading; Mark E. Vrabel, Southbridge, both of MA (US)

(73) Assignee: ATI International SRL, Christ Church (BB)

( * ) Notice: Subject to any disclaimer, the term of this patent is extended or adjusted under 35 U.S.C. 154(b) by 0 days.

(21) Appl. No.: 09/227,635

(22) Filed: Jan. 8, 1999

(51) Int. Cl.$^7$ ..................................................... G06T 15/00
(52) U.S. Cl. .............................. 345/419; 345/836; 725/37
(58) Field of Search ..................................... 345/419, 418, 345/425, 435, 629; 395/159; 348/565, 590; 382/279

(56) References Cited

U.S. PATENT DOCUMENTS

| | | | |
|---|---|---|---|
| 5,303,388 | * 4/1994 | Kreitman et al. | 395/159 |
| 5,461,706 | * 10/1995 | Trow et al. | 345/425 |
| 5,495,576 | * 2/1996 | Ritchey | 345/425 |
| 5,544,295 | * 8/1996 | Capps | 395/152 |
| 5,606,374 | * 2/1997 | Bertram | 348/565 |
| 5,678,015 | 10/1997 | Goh . | |
| 5,889,527 | * 3/1999 | Tsai | 345/435 |
| 5,894,310 | 4/1999 | Arsenault et al. . | |
| 5,937,104 | * 8/1999 | Henderson et al. | 382/279 |
| 5,995,104 | 11/1999 | Kataoka et al. . | |
| 6,005,579 | 12/1999 | Sugiyama et al. . | |
| 6,011,595 | * 1/2000 | Henderson et al. | 348/590 |
| 6,043,818 | 3/2000 | Nakano et al. . | |

OTHER PUBLICATIONS

Yoshinobu Tonomura and Shinji Abe, Content Oriented Visual Interface Using Video Icons for Visual Database Systems, 1989, pp. 68–73, IEEE, Piscataway, NJ USA.

Tyson R. Henry and Scott E. Hudson, Multidimensional Icons, ACM Transactions on Graphics, Jan. 1990, pp. 133–137, vol. 9, No. 1, ACM, Tucson, AZ, USA.

* cited by examiner

*Primary Examiner*—Cliff N. Vo
*Assistant Examiner*—Huedung X. Cao
(74) *Attorney, Agent, or Firm*—Vedder, Price, Kaufman & Kammholz

(57) ABSTRACT

A method and apparatus for providing a three-dimensional object on live video includes processing that begins by filling at least a portion of a back butler with a key color, where the key color indicates the presentation of the video. The processing then continues by writing the three-dimensional object into the back buffer. Note that by providing the key color into the back buffer as a clearing operation or having a back most Z value, when the three-dimensional object is written into the back buffer, it will be in a foreground viewing perspective with respect to the live video. The processing then continues by flipping the back buffer to become a primary surface such that the data stored in the primary surface is subsequently displayed on a display device.

21 Claims, 14 Drawing Sheets

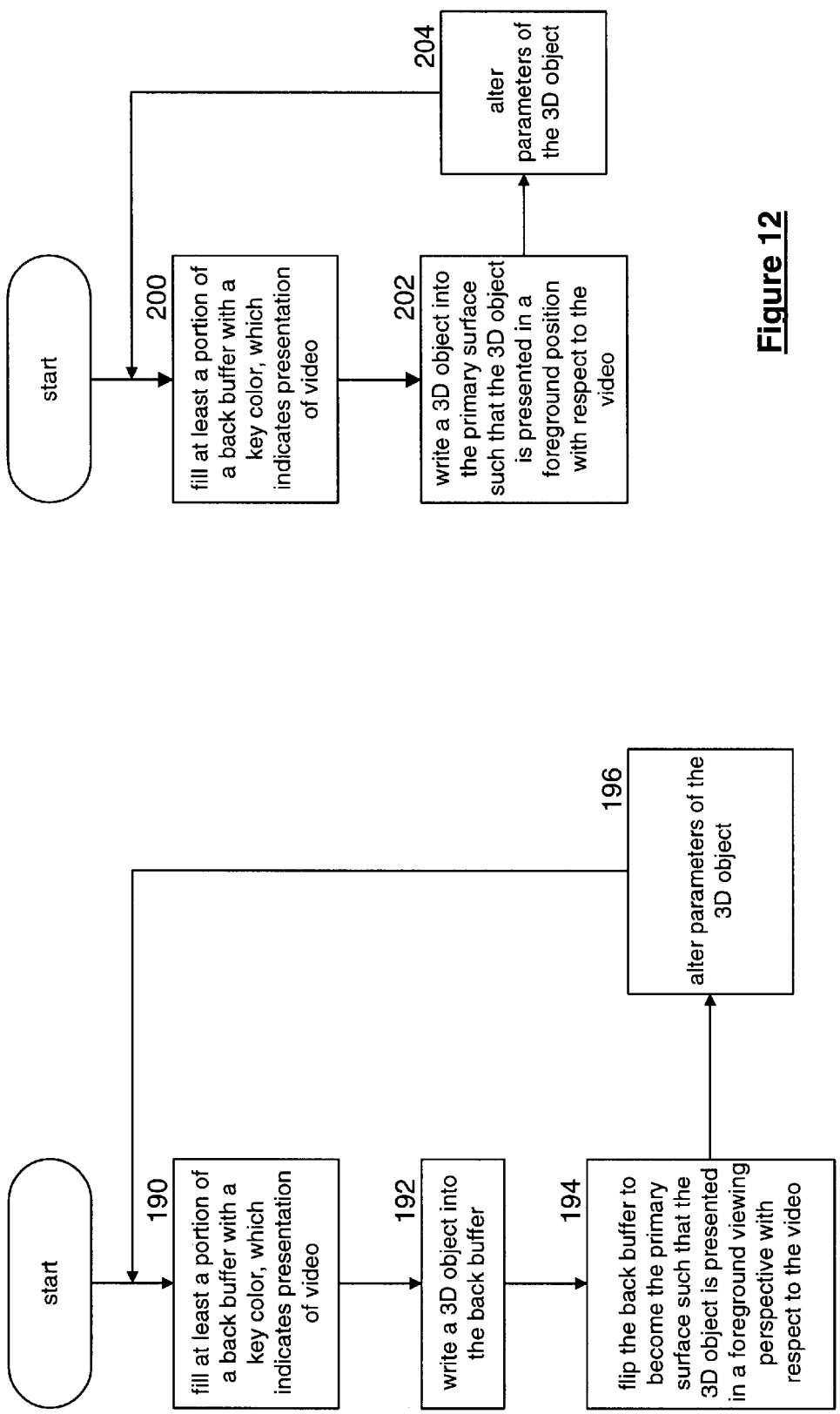

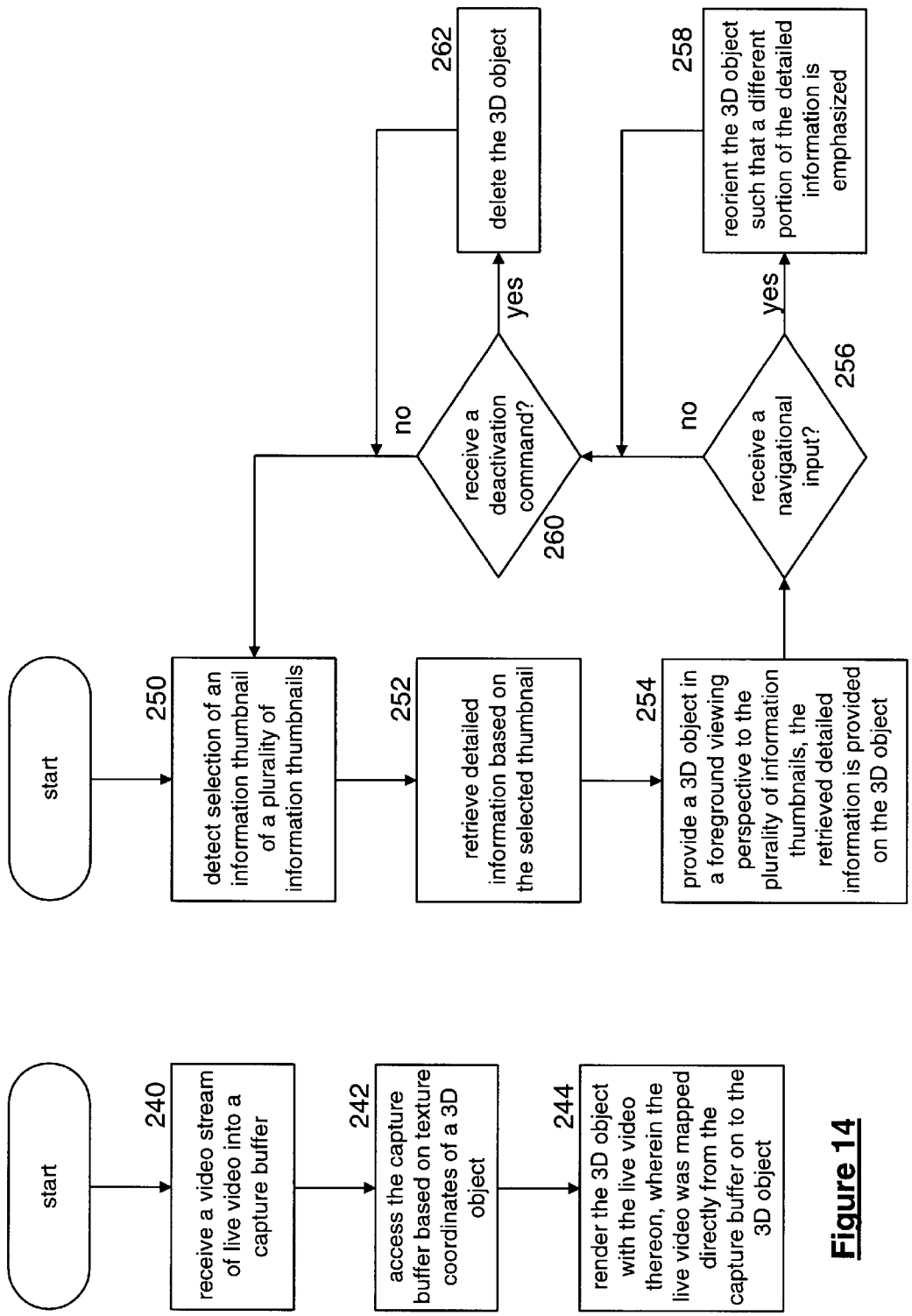

METHOD AND APPARATUS FOR PROVIDING A THREE DIMENSIONAL OBJECT ON LIVE VIDEO

TECHNICAL FIELD OF THE INVENTION

This invention relates generally to video signal processing and more particularly to video and graphic signal processing within set top box applications.

BACKGROUND OF THE INVENTION

The media business is expanding rapidly. For example, one may access video and/or audio media via broadcast television, cable television, satellite television, the internet, compact discs, video cassette tapes, audio cassette tapes, digital video discs, laser discs, etc. While there are many audio and video media sources and corresponding media storage devices, each requires a separate player. For example, a video cassette requires a video cassette player or recorder, a DVD disc requires a DVD player, a television broadcast requires a television tuner, etc.

Current consumer electronic trends are integrating many of the separate players into a system via integration devices. One such integration device is a set top box. The set top box receives inputs from various players (e.g., cable broadcasts, VCRs, etc.) and, based on user commands, provides signals from a selected player to a display (e.g., a television, a CRT monitor). Typically, the user will provide a command via a wireless remote controller. Such a command may be to adjust the volume, change the channel, change picture settings, display a menu, etc. In response to the command, the set top box, or one of the players, generates a two-dimensional graphical representation of the command and may further provide a two-dimensional representation of the execution. The graphical representation is often called a graphical user interface.

As an example of the graphical user interface, assume that a command has been received to adjust the audio volume on a television. As the command is processed, a two-dimensional graphic is displayed that illustrates the volume increasing or decreasing. As another example, a user may provide a command to a satellite receiver that causes a channel guide to be displayed. The user, via the wireless remote controller, or via inputs on the satellite receiver, selects a channel and time of interest. At this point, the selected channel is highlighted by a color change. The user then provides additional commands to obtain brief information regarding the program airing at the selected time and to view the selected program. Based on the user's command, the additional information is displayed and/or the program is displayed. As still a further example, when the user is viewing a program that is processed by a satellite receiver, the user may input a command causing two-dimensional graphics that include text information to be displayed over the program.

As video processing technologies evolve, a few three-dimensional graphical interfaces have been developed. Once such three-dimensional video graphical interface provides a three dimensional hallway effect where text data is provided on each of the walls, floor, and ceiling. As the perspective fades into the distance, the text size diminishes accordingly.

When live video (e.g. video signals provided by a VCR, satellite broadcast, DVD player, etc.) has been used in conjunction with three-dimensional graphical interfaces, the results have been less than desirable. For example, when live video is mapped onto a surface, which may be a two-dimensional window or a surface of a three-dimensional object, the live video is copied into a texture map. Once stored in the texture map, it is mapped onto the surface. The steps of copying and then mapping cause delays in displaying the live video, resulting in a non-real time displaying of the live video. As is known, video graphics hardware dictates that video data must be written into a texture map before it can be mapped onto a surface. This requirement results because the hardware operates on texture maps that have sizes (i.e., height and depth) constrained to powers of 2 due to the scaling of the texture maps and the generation of MIP maps. The video data, however, is based on a display size (e.g., 640×480), which is not sized in accordance with the power of 2 requirement. As such, the video decoder that processes the video signals and the video graphics circuit are not directly compatible.

Therefore, a need exists of a method and apparatus of providing real time three-dimensional objects and live video integration.

BRIEF DESCRIPTION OF THE DRAWING

FIG. 11 illustrates a logic diagram of a method for providing a three-dimensional object on top of live video in accordance with present invention;

FIG. 12 illustrates a logic diagram of an alternate method for providing a three-dimensional object on top of a live video in accordance with the present invention;

FIG. 14 illustrates a logic diagram of an alternate method for providing live video on a three-dimensional object in accordance with the present invention;

FIG. 15 illustrates a logic diagram of a method for providing a three-dimensional graphical user interface in accordance with the present invention.

DETAILED DESCRIPTION OF A PREFERRED EMBODIMENT

Generally, the present invention provides a method and apparatus for providing a three-dimensional object on live video. Such processing begins by filing a least a portion of a back buffer with a key color, where the key color indicates the presentation of the video. The processing then continues by writing the three-dimensional object into the back buffer. Note that by providing the key color into the back buffer as a clearing operation or having a back[ ]most Z value, when the three-dimensional object is written into the back buffer, it will be in a foreground viewing perspective with respect to the live video. The processing then continues by flipping the back buffer to become a primary surface such that the date stored in the primary surface is subsequently displayed on a display device. With such a method and apparatus, real time three-dimensional object and live video integration is provided.

Figure 1:
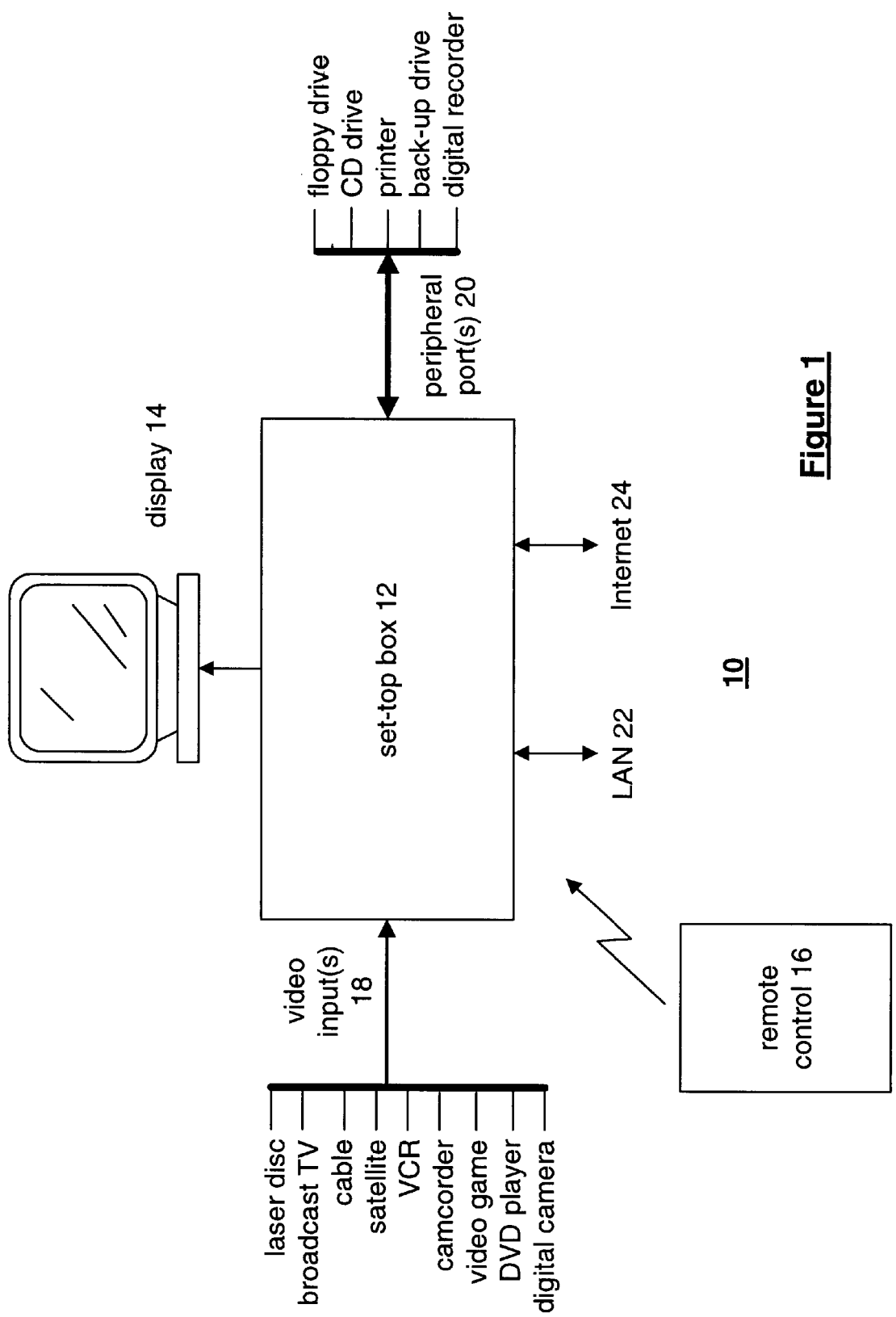
FIG. 1 illustrates a schematic block diagram of a set top box intracoupling in accordance with the present invention.

The present invention can be more fully described with reference to FIGS. 1 through 16. FIG. 1 illustrates a schematic block diagram of an entertainment system 10 that includes a set top box 12, a display 14, and a remote control 16. The set top box 12, which will be discussed in greater detail with reference to FIGS. 2 through 16, includes a video input port, or ports, 18 and a peripheral port, or ports, 20. In addition, the set top box 12 may be operably coupled to a local area network 22, the Internet 24, a telephone line, etc. The video inputs 18 may be operably coupled to receive video signals, i.e., live video, from a laser disk player, broadcast television, cable broadcast, satellite broadcast, video cassette recorder, camcorder, video game, DVD player, and/or a digital camera. The peripheral ports 20, which may include a PCI port, USB port, and/or RS 232 port, may be operably coupled to a floppy disk drive, a CD drive, a printer, a backup drive, and/or a digital recorder.

The set top box 12 is operably coupled to receive commands from a user via the remote control 16. One such command instructs the set-top box 12 to select one of the video input sources as the source of the live video that will subsequently be displayed on the display 14. The display 14 may be a television set, CRT monitor, flat LCD panel, high definition television, projection television, etc. As coupled, the set top box 12 provides the user an integration device that couples video sources, local area networks, internet and/or peripheral devices into an integrated system. Note that other commands include, but are not limited to, select output device, connect to the Internet, connect to the local area network, change settings on the display, display demonstration applications, etc.

Figure 2:
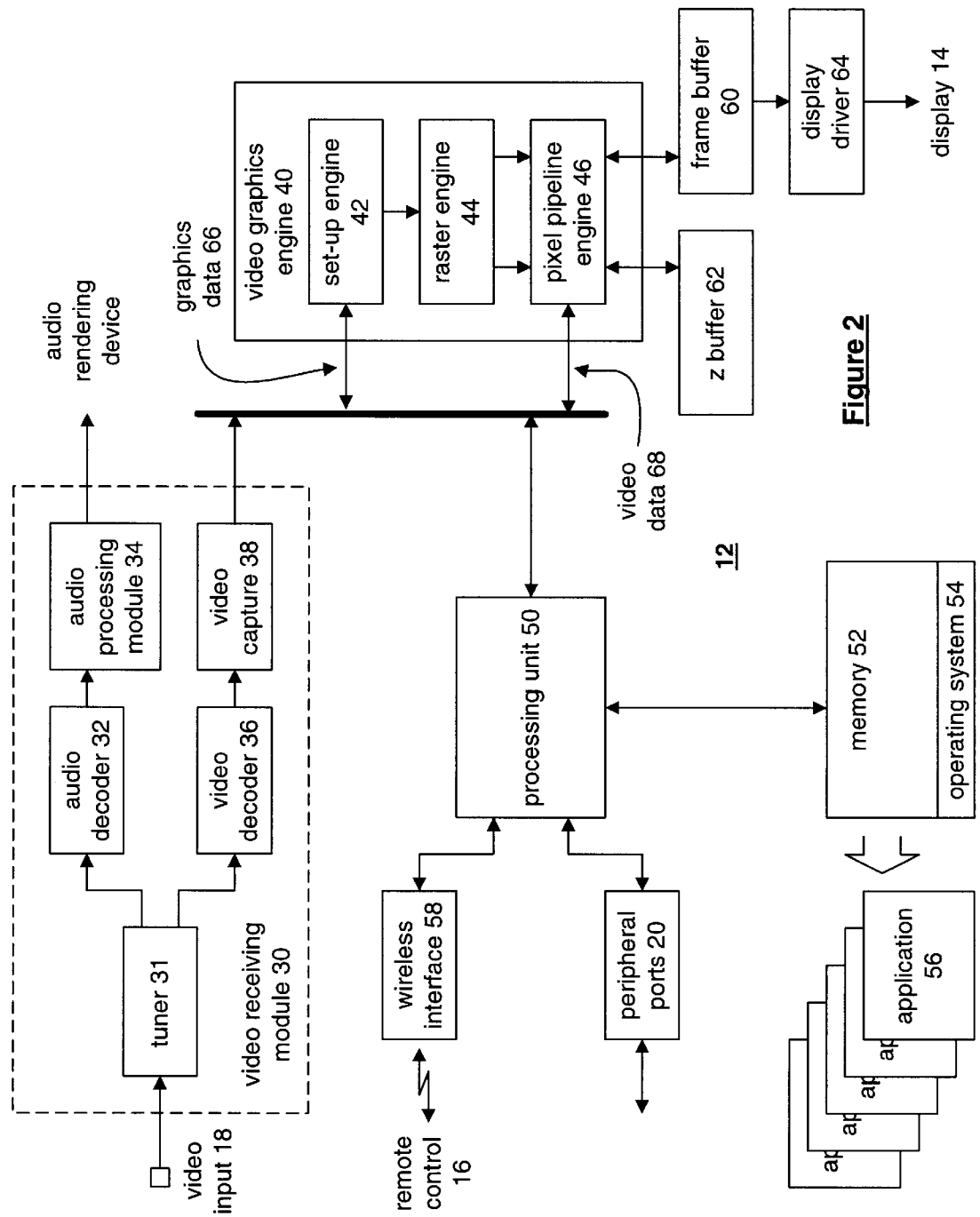
FIG. 2 illustrates a schematic block diagram of a set top box in accordance with the present invention.

FIG. 2 illustrates a schematic block diagram of the set top box 12. The set top box 12 includes at least one video receiving module 30, at least one video graphics engine 40, at least one processing unit 50, at least one memory device 52, at least one frame buffer 60, at least one Z buffer 62, and at least one display driver 64. The video receiving module 30 includes a tuner 31 that is operably coupled to the video input port 18. The tuner receives the video signals and digitizes the audio component and video component. The digitized audio is provided to an audio decoder 32 while the digitized video is provided to a video decoder 36. The audio decoder 32 receives the digitized audio and decodes it. The decoded audio signal is provided to an audio processing module 34 which produces an analog representation thereof. The analog signal is then provided to an audible rendering device that renders the signal audible.

The video decoder 36 is operably coupled to receive the digitized video and produce therefrom a decoded video signal. The decoded video signal is then stored in a video capture memory device 38. The video receiving module 30 functions in a similar manner as to the video processing section of an All-in-Wonder board manufactured and distributed by ATI Technologies. As such, no further discussion of the video receiving module 30 will be provided except to illustrate the present invention.

The processing unit 50 is operably coupled to a wireless interface 58, the peripheral ports 20, the memory 52, the video receiving module 30, and the video graphics engine 40. The processing unit 50 may be a microprocessor, microcomputer, central processing unit, digital signal processor and/or any other device that manipulates digital information based on programming instructions. Based on the operating system 54 stored in memory 52, the processing unit 50 coordinates the operation of the set top box based on commands received from the user. Note that the operating system 54 may be a commercially available operating system such as Windows 95, Windows 98, Windows NT, and Windows CE, all of which are registered trademarks of Microsoft, Inc.

The user provides commands via a remote control 16 that is received via the wireless interface 58, or via an input key pad on the set-top box 12. The wireless transmission scheme may use infrared transmission modulation techniques (e.g., Fast IR, Slow IR, Amplitude Shift Keying, and/or pulse position modulation) or radio frequency modulation techniques (Amplitude Modulation, Frequency Modulation, etc.). In either case, the commands are encoded into the appropriate transmission scheme and subsequently decoded by the wireless interface 58. The decoded commands are then provided to the processing unit 50, which processes them accordingly. As instructed, the processing unit 50 may cause a menu to be displayed, execute an application 56, copy video data into memory or to a peripheral device, such as a floppy disk, change settings of the display, change volume, and/or any other user preference that changes input signals, output signals and/or the processing thereof.

The video graphics engine 40 includes a setup engine 42, a raster engine 44, and a pixel pipeline engine 46. The setup engine is operably coupled to receive graphics data information 66 while the pixel pipeline engine 46 in operably coupled to receive video data 68 via the video capture memory device 38. As coupled, and as further explained with reference to FIGS. 3 through 16, the video graphics engine 40 provides, and/or supports, integration of three-dimensional objects with live video in real time.

In general, the pixel pipeline engine 46 uses the video data 68 that is stored in the video capture memory device 38 as a texture map thereby allowing it to directly map the video data onto a three-dimensional object and/or place it as background video. The graphics data 66 typically includes parameters for each of a plurality of object elements (e.g., triangles) that comprise an object that is to be displayed. The parameters indicate the color data, physical coordinates (i.e., the displays X and Y coordinates of the object-element), and texture coordinates for each vertex of the object-element. Based on these inputs, the setup engine 42 generates setup information that the raster engine utilizes to produce Z value information for each pixel location of an object-element and color information of each pixel of each object-element. This information is provided to the pixel pipeline engine 46, which, in conjunction with texture map information, produces the resulting pixel data. Note that the video capture memory device 38 is registered as a texture map, and as such, it may be utilized by the pixel pipeline engine 46 like any other texture map.

By utilizing texture maps, the pixel pipeline engine 46 maps the texture information (patterns, texture, metallic effects, reflections, etc.) onto the object-elements. The pixel pipeline 46 may map more than one texture onto a particular object-element, which is called texture composite. For example, the pipeline engine 46 may map live video, environmental effects (e.g., a face, terrain) bumps, fogging, and/or specular lighting together to produce composite effects. As such, the pixel pipeline engine 46 maps the texture information on to the object-elements to produce processed pixel data. The processed pixel data is then rendered into the frame buffer 60. Once a full-frame of processed pixel data has been rendered into the frame buffer 60, it is provided to a display driver 64 which, in turn, provides it to the display 14. Note that the frame buffer 60 may store a frame of data when the display device is a progressive display or a field of information when the display device is an interlace device.

The video graphics engine 40 functions in a similar manner to the video graphics engine found in the All-in-One Wonder board manufactured and distributed by ATI Technologies. The video graphics engine 40, however, is modified to include the functionalities of the present invention. As such the details of the video graphics engine 40 will be discussed only in sufficient detail to illustrate the functions of the present invention.

Figure 3:
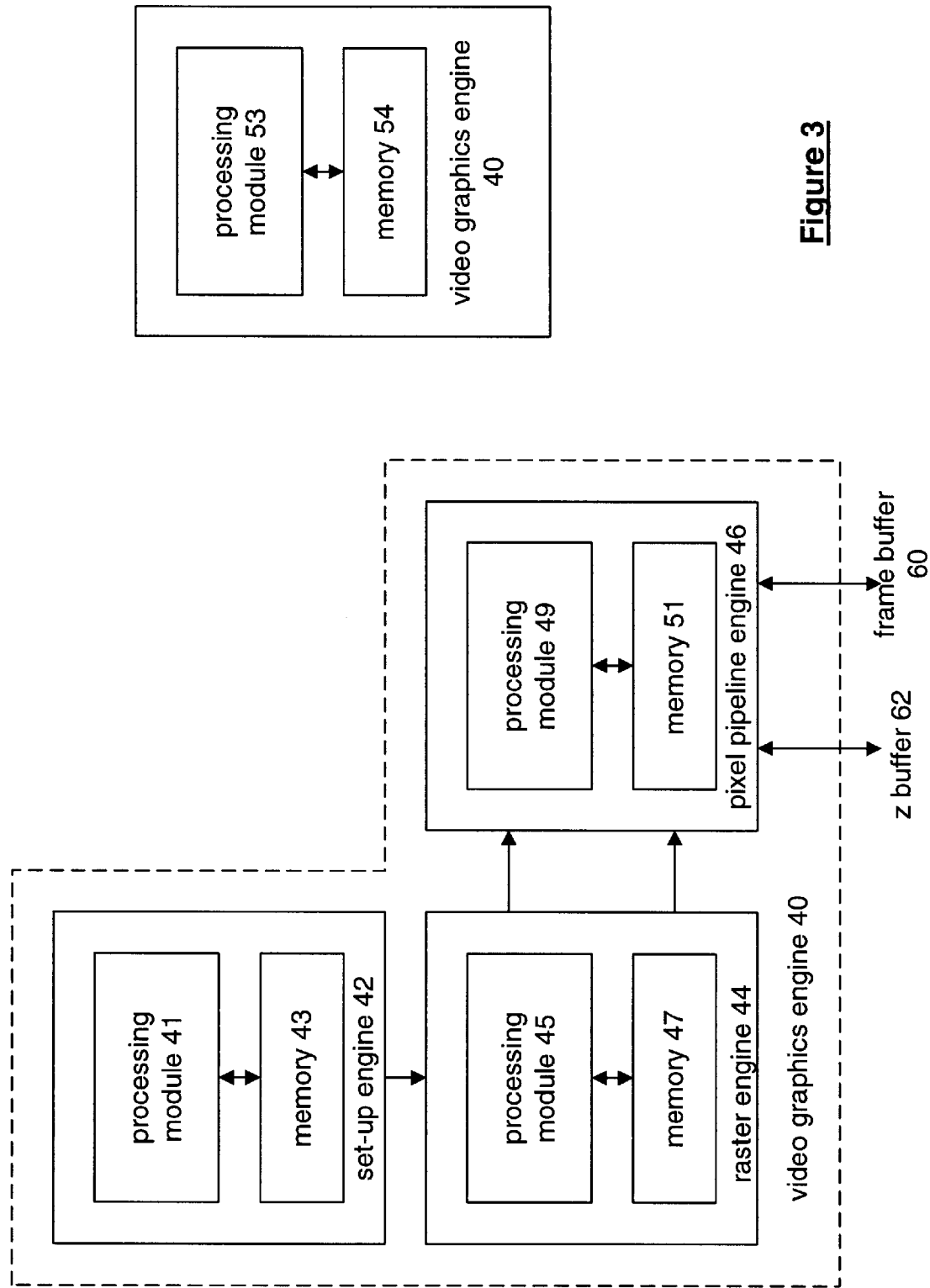
FIG. 3 illustrates a schematic block diagram of a video graphics engine in accordance with the present invention.

FIG. 3 illustrates two schematic diagrams of the video graphics engine 40. In one diagram, the video graphics engine 40 includes the setup engine 42, the raster engine 44, and the pixel pipeline engine 46. Each of the engines, 42, 44 and 46 includes a processing module 41, 45 and 49, and memory 43, 47 and 51. Each of the processing modules 41, 45 and 49 may be a single processing entity or a plurality of processing entities. Such a processing entity may be a microprocessor, microcontroller, digital signal processor, video processor, central processing unit, state machine, logic circuit, and/or any other device that manipulates digital information based on programming and/or operating instructions. The memory 43, 47 and 51 may be a single memory device or a plurality of memory devices. Such a memory device may be a readonly memory, random access memory, floppy disk memory, hard disk memory, magnetic tape memory, CD memory, DVD memory, and/or any other device that stores digital information. Note that if processing modules 41, 45 or 49 include a state machine and/or logic circuitry to perform one or more of its functions, the memory storing the corresponding instructions is embedded into the circuitry comprising the state machine and/or logic circuitry. As configured, any one of the engines 42, 44 and 46 may perform at least some of the operational instructions as further described with reference to FIGS. 8 through 16.

The second schematic diagram of the video graphics engine 40 includes a processing module 53 and memory 54. The processing module may be a single processing entity or a plurality of processing entities. The memory 55 may be a single memory device or a plurality of memory devices. As coupled, the memory stores operational instructions that enable the processing module 53 to perform one or more of the methods described in FIGS. 8 through 16.

In the case of rendering a three-dimensional object 92 on live video 90, the frame buffer 60 utilizes a key color 100 to indicate the areas on the display that are to display the live video 90. As such, the key color 100 functions as a blue screen for displaying the live video. The three-dimensional object 92 is rendered into the back buffer 98 of the frame buffer 60 over the key color information 100. The rendering of the three-dimensional object 92 is a standard operation for the video graphics engine 40 of the All-in-Wonder board. Once the back buffer 98 has a full frame, or field of data, a page flip occurs such that the back buffer 98 becomes the primary surface 96. The primary surface provides the data to the display 14 for subsequent display. Note that the video information is stored in the video capture memory device 38 and is rendered into the back buffer 98 at the locations indicated by the key color 100.

As an alternative implementation of presenting three-dimensional objects 92 on live video 90, the frame buffer may include only a primary surface 96. In this embodiment, the key color 100 and the three-dimensional object are rendered directly into the primary surface 96.

When the live video is being rendered onto a three-dimensional object, the frame buffer 60 utilizes the video capture memory device 38 as a texture map. To establish the video capture memory device 38 as texture map, it is registered as such. The registration includes identifying the video capture as a texture map, defining its location in memory, which may be a part of the frame buffer 60, and the format of the texture map. The size of the registered video capture memory device 38 is registered as having a size that conforms to the power of 2 requirement of the video graphics engine 40. As such, the video capture memory device 38 appears as a normal texture map to the video graphics engine such that no copying is required to a texture map. As such, real time texture mapping of video may be done.

Figure 4:
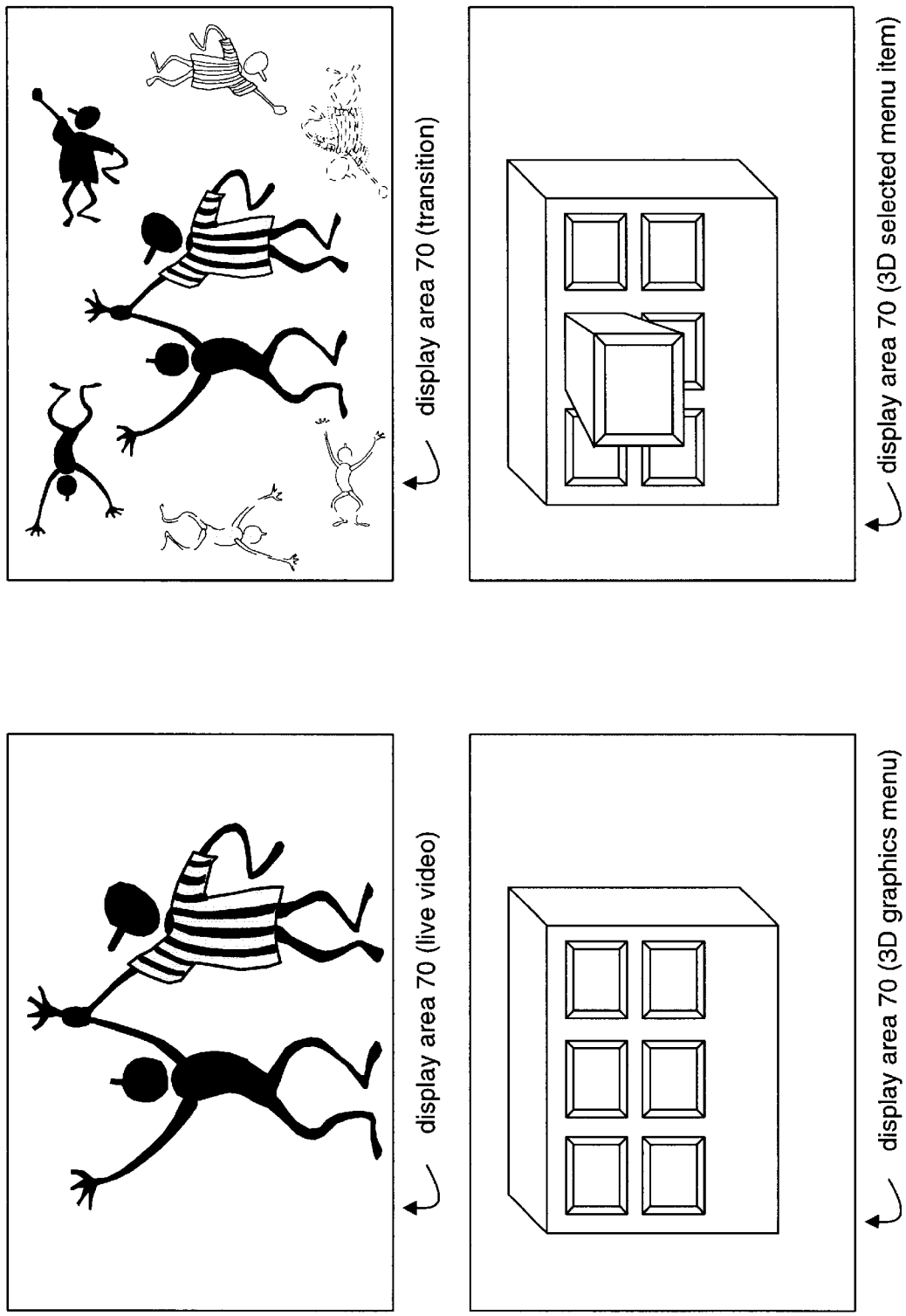
FIG. 4 illustrates a graphical representation of three-dimensional/live video transitions in accordance with the present invention.

FIG. 4 illustrates a graphical representation of transitioning from displaying live video to displaying a three-dimensional graphical interface having a particular menu item selected. As shown in the upper-left portion of the figure, the display area 70 is presenting live video. When a user enters a command for the display of the three-dimensional graphical user interface menu, the processing unit 50 and/or the video graphics engine 40 cause a transition between the live video and the three-dimensional menu to occur. The transition may be done in a variety of ways. For example, the display area may be represented by a plurality of object-elements (e.g., triangles, or other geometric shape), of sufficiently small size to manipulate the video image in a variety of ways. When the display area 70 is displaying live video, the plurality of object-elements are arranged in a two-dimensional manner such that the display area appears as a flat screen. In other words, the Z values and physical coordinates for each of the plurality of object-elements are set to form a planar surface (e.g., all the Z values are the same).

To achieve a three-dimensional transition, the Z values and/or physical coordinates of the plurality of object-elements are altered to produce a desired affect. As shown in FIG. 4, a transition may occur by manipulating the figures within the live video to have them be dispersed as the image fades away. Alternatively, the transition may have the display area appear as a piece of paper that is being crumpled and discarded. As one of average skill in the art would readily appreciate, the transition from live video to the three-dimensional graphics menu may be done in wide variety of ways.

Once the transition is complete, the display area 70 displays the three-dimensional graphics menu. The three-dimensional graphics menu includes a plurality of menu items that may be selected by the user. Once the user has selected a particular menu item, the video graphics engine provides an enhanced three-dimensional graphical representation of the selected menu item. This is shown in the lower-right portion of FIG. 4. If the user were to enter an additional command instructing the selected menu item to be performed, the video graphics engine and the other components of the set top box would respond accordingly. For example, the menu item may be requesting displaying an application, which may be a demonstration application, a user instruction application, a channel change, a selection of the DVD player, etc.

Figure 5:
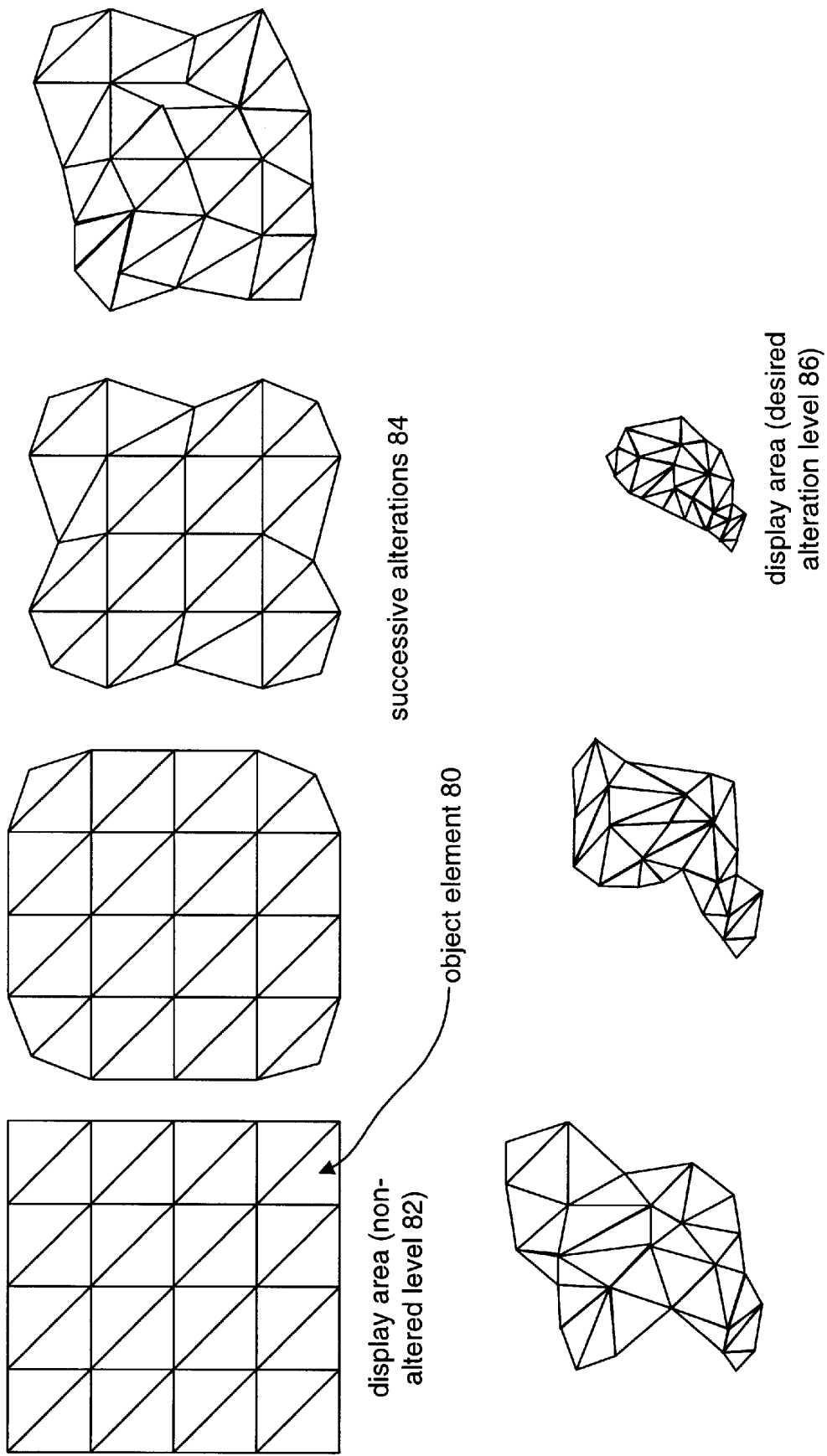
FIG. 5 illustrates a graphical representation of a three-dimensional/live video transition that includes successive alterations of plurality of object-elements in accordance with the present invention.

FIG. 5 illustrates a graphical representation of a display area including a plurality of object-elements 80. The figure further illustrates successive alterations 84 that manipulate the plurality of object-elements to produce a crumpling of paper effect. As shown, when the display area is in a non-altered level state 82, the object-elements are arranged in a planar manner. When an input command is received to transition from, for example, live video to three-dimensional video graphics, or from three-dimensional graphics to live video, the plurality of object-elements are successively altered. The alterations continue until the desired alteration level 86 is achieved. For example, the first alteration level may be the two-dimensional planar level while the desired alteration level is representative of crumpled paper. Alternatively, the desired alteration level may be a two-dimensional planar effect and the first alteration level may be the crumpled paper effect. As such, for example, the live-video data may be displayed on the planar display area and transition to the crumpled paper (i.e., the desired alteration level). Once the desired alteration level is reached, the three-dimensional graphics menu is mapped onto the plurality of object-elements. The object-elements are then successively altered to the non-altered level 82.

Figure 6:
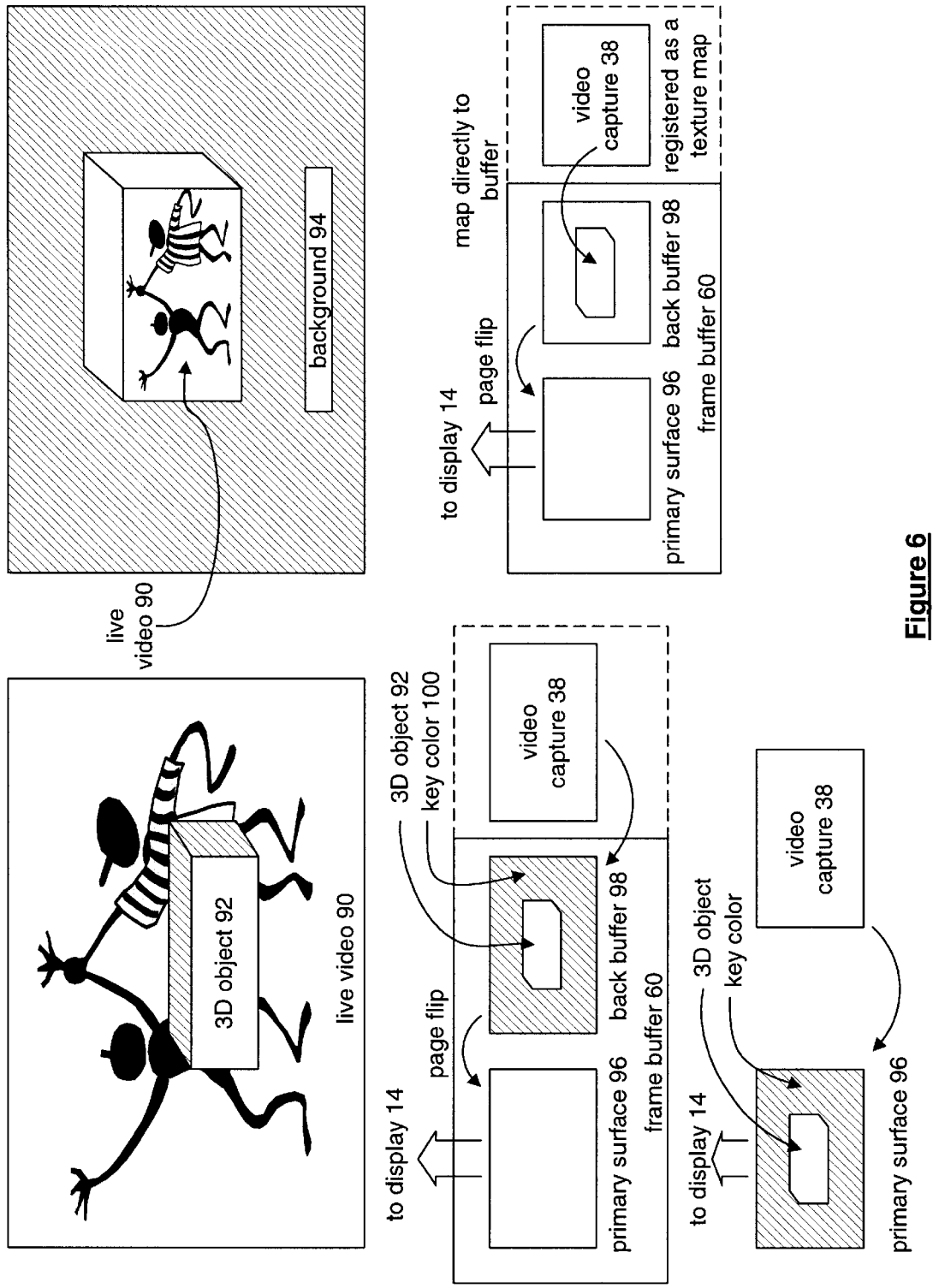
FIG. 6 illustrates frame buffer operation for three-dimensional objects and live video interaction in accordance with the present invention.

FIG. 6 illustrates a graphical representation and frame buffer operation of real-time integration of three-dimensional objects and live video. As shown, a three-dimensional object 92 may be traced on top of live video 90. As is also shown, the live video 90 may be placed on a three-dimensional object where the three-dimensional object is in a foreground position with respect to a background image 94. Note that the background image may be live video from another video source, the same video source and/or it may be graphics data representing a background pattern, an application, the three-dimensional graphical user interface, and/or any other type of computer generated data.

To conform to the power of 2 size requirement, the size of the video capture memory device 38 is physically or logically adjusted. A logical adjustment is achieved by performing an address translation function, or scaling function, during the reading or writing of data to the video capture memory device 38. As such, video data that is outside the power of 2 height or width of the video capture memory device 38 is clipped. The video capture memory device 38 may be physically adjusted by modifying the output of the video decoder 36 such that it outputs the video data in a power of 2 format. In either case, as registered, the video capture memory device 38 appears as a normal texture map to the video graphics engine 40, thereby enabling the video graphics engine to map directly the live video onto the three-dimensional object without first having to store it in a separate texture map. As such, the video graphics engine provides real-time integration of a live video and three-dimensional objects.

Figure 7:
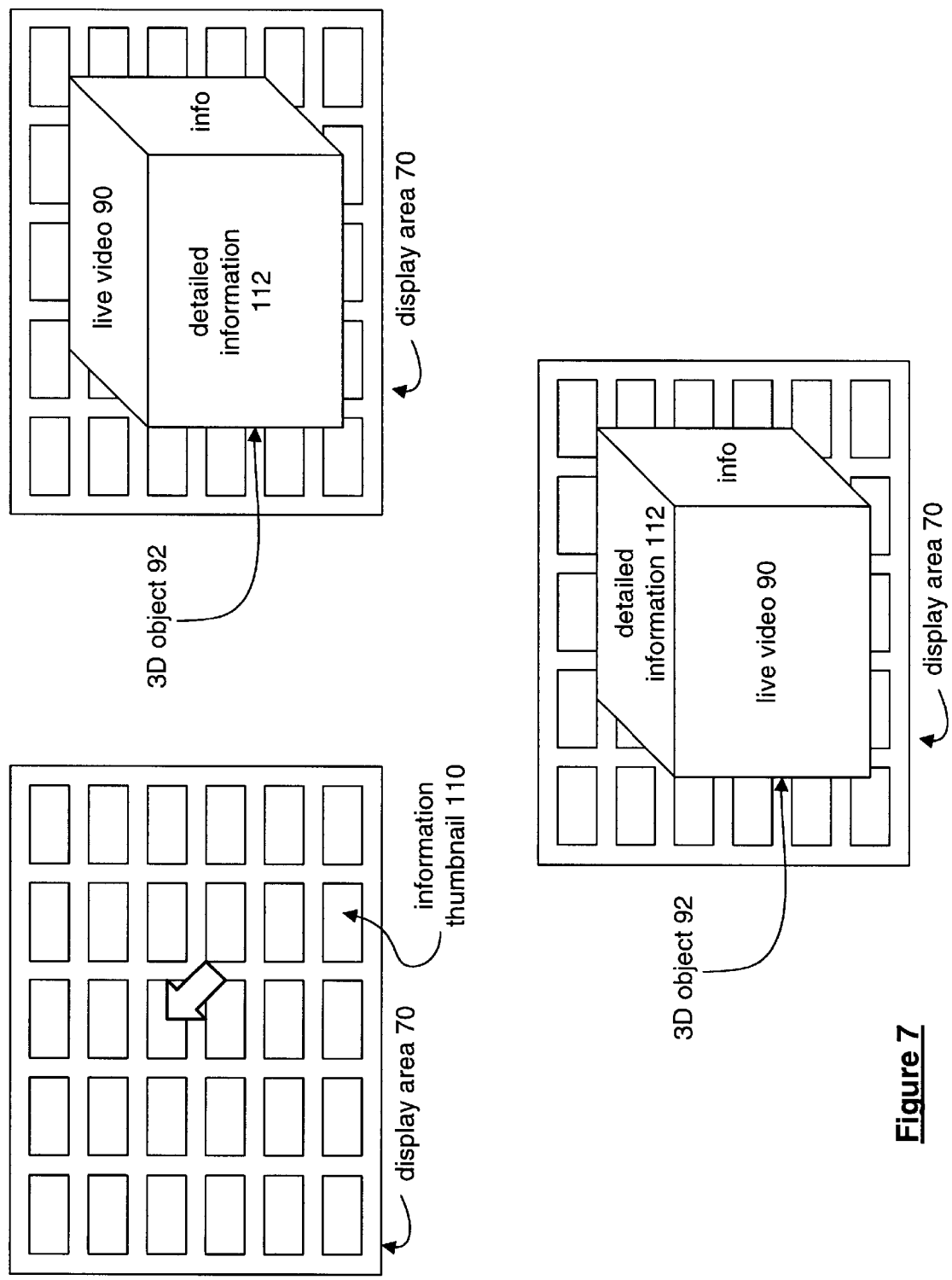
FIG. 7 illustrates a graphical representation of a three-dimensional graphical user interface in accordance with the present invention.

FIG. 7 illustrates a graphical representation of a three-dimensional graphical user interface operation. As shown in the upper-left portion of the Figure, a display area 70 is illustrating a plurality of information thumbnails 110. As previously mentioned, the display area 70 may be a full-screen of the display or a portion thereof. The information thumbnails include thumbnail information of a related subject. For example, if a plurality of thumbnails 110 corresponds to a television viewing guide, each thumbnail corresponds to a particular time and channel wherein the thumbnail information indicates the particular program being presented at that time. Alternatively, the thumbnails may be related to Internet information, video titles of DVD disks, VCR tapes, etc.

When one of the information thumbnails 110 is selected, a three-dimensional object 92 is displayed in a foreground viewing perspective with respect to the plurality of thumbnails 110. As shown in the upper-right portion of FIG. 7, the three-dimensional object 92 is a cube having three visible surfaces. On the primary surface, detailed information 112 is displayed. On the other surfaces, additional information may be displayed, or live video 90 may be displayed. Such is the case if the plurality of thumbnails corresponds to television information. As one of average skill in the art would readily appreciate, the three-dimensional object 92 may be of any three-dimensional shape including, but not limited to cubes, spheres, tubes, and/or any combination thereof.

The user may interactively reorient the three-dimensional object 92 via a navigational input. When the set top box receives a navigational input, the three-dimensional object is rotated to emphasis a different surface. As shown, the three-dimensional object is rotated to emphasize the live video 90 surface. Note that when a previously emphasized surface is placed in a non-emphasized surface position, the information may remain the same, or may be changed to a subset of the information. As one of average skill in the art would further appreciate, the information presented on the three-dimensional object may vary according to the particular subject matter of interest. For example, if the plurality of thumbnails is representative of a channel guide and a particular program has been selected, the live video may be displayed along with detailed information of the program, mature nature of the program, detailed information regarding the actors, etc.

Figure 8:
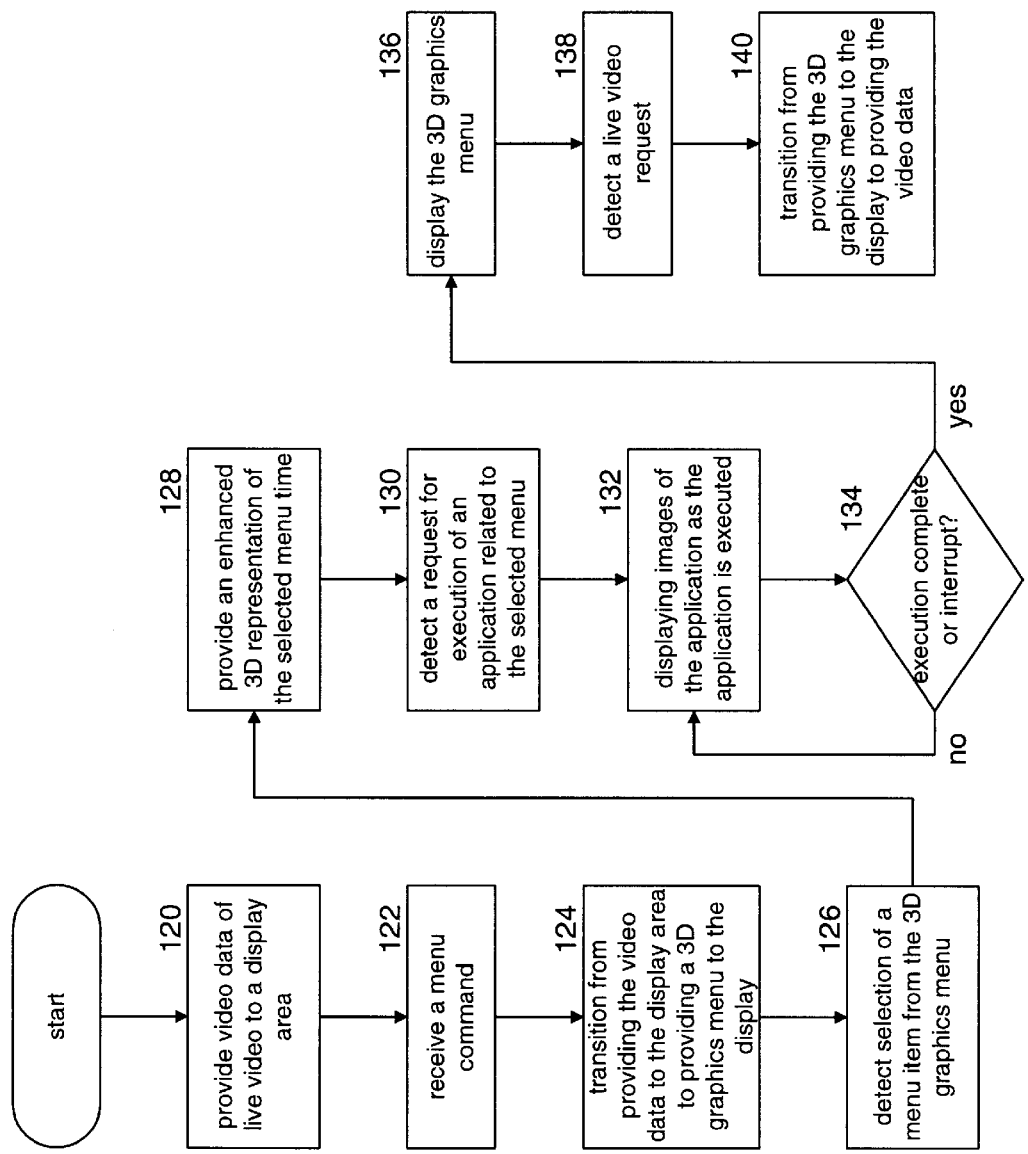
FIG. 8 illustrates a logical diagram of a method for set top box operation in accordance with the present invention.

FIG. 8 illustrates a logic diagram of a method for providing set top box operation in accordance with the present invention. The processing steps shown in FIG. 8 may be executed by the processing unit 50 and/or the video graphics engine 40. The process begins at step 120 where video data of live video is provided to a display area. As previously mentioned, the display area may be full screen of the display or a portion thereof. The process then proceeds to step 122 where a menu command is received. The process then proceeds to step 124 where a transition from providing the video data to the display to providing a three-dimensional graphics menu to the display occurs. The transition may occur by manipulating a plurality of object-elements wherein the live video is mapped onto the plurality of object-elements as they are manipulated. In addition, or alternatively, some of the video data may be mapped into some of the object-elements while a portion of the three-dimensional graphics menu is mapped into other object-elements of the plurality of object-elements. As such, a morphing of the live video and three-dimensional graphics menu occurs.

The process then proceeds to step 126 where a selection of a menu item from the three-dimensional graphics menu is detected. The process then proceeds to step 128 where an enhanced three-dimensional representation of the selected menu item is provided. This was illustrated in FIG. 4.

The process then proceeds to step 130 where a request for execution of an application is detected as indicated by a selected menu item on the three-dimensional graphics menu. Note that the applications may include, but are not limited to, demonstration applications, a viewing parameter change application, an audio setting change application, a transition setting application, live video source application, user help applications, and an internet access application. The demonstration applications may include video and/or multimedia data that provides a user with instructions on how to use the set-top box, how to configure the set-top box, etc.

The process then proceeds to step 132 where images of the application—as it is being executed—are displayed. The displaying continues until the execution of the application is complete or an interrupt occurs. An interrupt may occur when the user terminates execution of the application by providing another input having interrupt priorities. Note that the transition from the three-dimensional graphics menu to the displaying of images of the application may be done in a three-dimensional transition manner.

The process then proceeds to step 134 where a determination is made as to whether the execution of the application is completed or interrupted. If neither has occurred, the process continues to repeat at steps 132 and 134. Once the execution is complete, or is interrupted, the process proceeds to step 136. At step 136, the three-dimensional graphics is again displayed. Note that the transition from the displaying images of the application to displaying the three-dimensional graphics menu may occur in a three-dimensional transitional manner. Such a three-dimensional manner was discussed with reference to FIGS. 4 and 5 and will be further discussed with reference to FIGS. 9 and 10.

The process then proceeds to step 138 where a request for live video is detected. The process then proceeds to step 140 where a transition from providing the three-dimensional graphics menu to the display to providing the video data to the display occurs.

Figure 9:
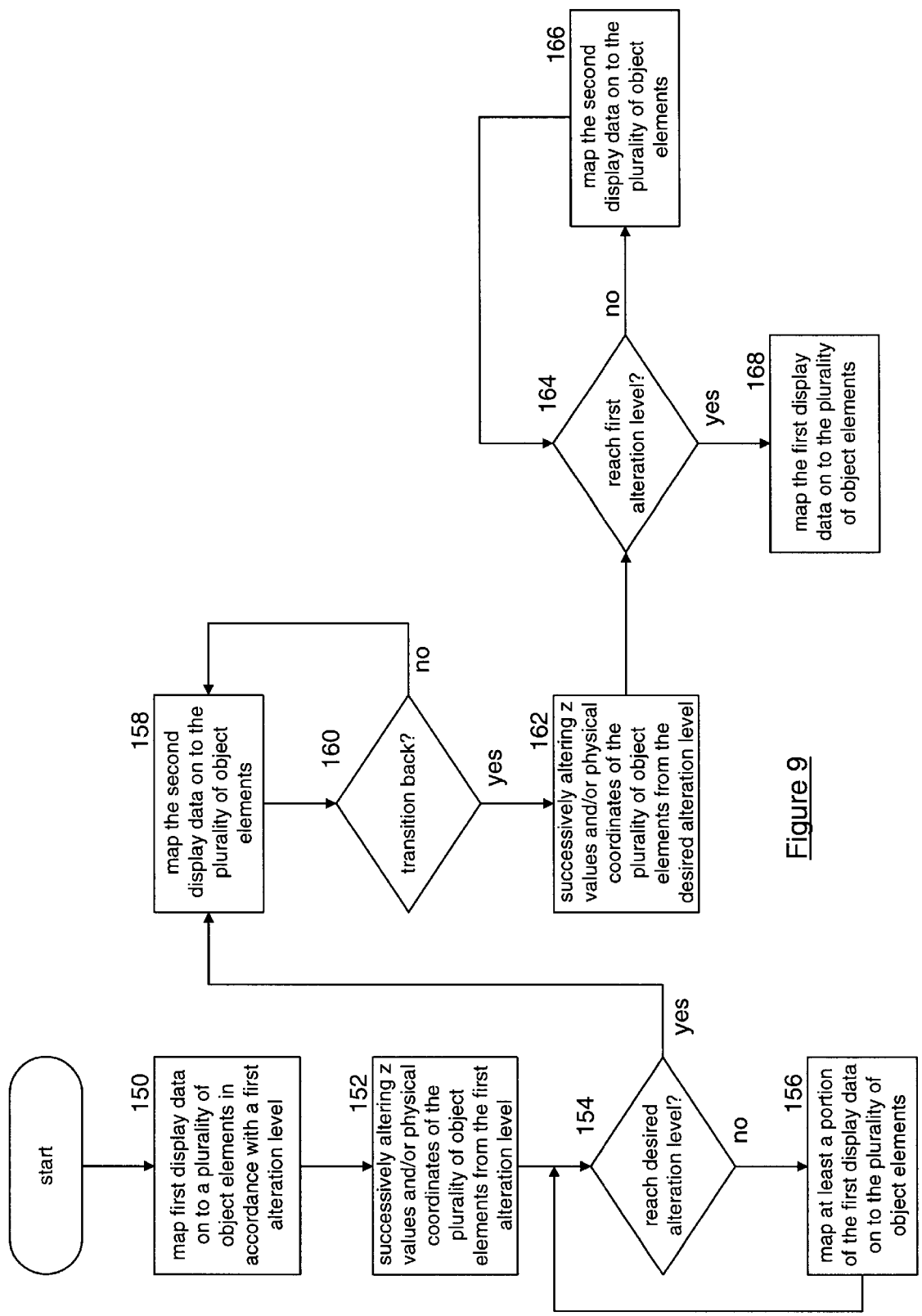
FIG. 9 illustrates a logic diagram of a method for three-dimensional object/live video transitions in accordance with the present invention.

FIG. 9 illustrates a logic diagram of a method for providing a transition between first display data and second display data. The processing steps of FIG. 9 may be stored on a separate digital storage device such as a random access memory, floppy disk memory, read-only memory, magnetic tape, CD, DVD, etc. In addition, or alternatively, the processing steps may be stored in memory within the set top box and subsequently executed by the video graphics engine 40 and/or the processing unit 50. The process begins at step 150 where first display data is mapped onto a plurality of object-elements in accordance with a first alteration level. Note that the plurality of object-elements constitutes a display area. Further note that the first display data and second display data may be graphics data, three-dimensional graphics data, three-dimensional graphics user interfaces and/or live video. Still further note that the process of mapping refers to texture mapping such that the texture coordinates of an object-element are used to reference a texture map, which, in accordance with the present invention, includes the video capture 38.

The process then proceeds to step 152 where the Z values and/or physical coordinates of object-elements are successively altered from the first alteration level. As discussed with reference to FIG. 5, the first alteration level may be indicative of a two-dimensional planar surface. As such, if the first display data were a live video, when displayed on the plurality of object-elements that conform with the first alteration level, it would appear that the live video is being presented on a flat surface. Note that the altering of the Z values and/or physical coordinates of the plurality of object-elements typically occurs in response to a user input command.

The process then proceeds to step 154 where a determination is made as to whether the successive alterations have reached a desired alteration level. Note that the first alteration level and the desired alteration level each comprise, for each of the plurality of object-elements, a Z value equal to a default value and a color data equal to a key color, or it has the Z value equal to a desired value and the color data equal to a key color. As such, when the Z value equals a default Z value, a planar surface is obtained and when the Z value equals a desired Z value, the desired transition effect is being executed.

If the desired alteration level has not been reached, the process proceeds to step 156. At step 156, at least a portion of the first display data is mapped onto the plurality of object-elements. As each successive alteration is executed, the resulting mapped data is rendered to a frame buffer and subsequently displayed on a display. As an alternative, the mapping may include mapping at least a portion of the second display data onto a plurality of object-elements intermixed with the portion of the first display data. As such a morphing effect can be achieved during the transition process.

Once the desired alteration level has been reached, the process proceeds to step 158. At step 158, the second display data is mapped onto the plurality of object-elements. The process then proceeds to step 160 where a determination is made as to whether a transition back is to occur. If not, the second display data is continually displayed as shown at step 158.

Once a transition back has been detected, the process proceeds to step 162. At step 162, the Z values and/or physical coordinates of object-elements are successively altered from the desired alteration level. The process then proceeds to step 164 where a determination is made as to whether the first alteration level has been reached. If not, the second display data is mapped onto the plurality of object-elements. The mapping of the second display data on the plurality of object-elements continues for each successive alteration until the first alteration level is reached. Once the first alteration level is reached, the process proceeds to step 168. At step 168, the first display data is mapped onto the plurality of object-elements.

Figure 10:
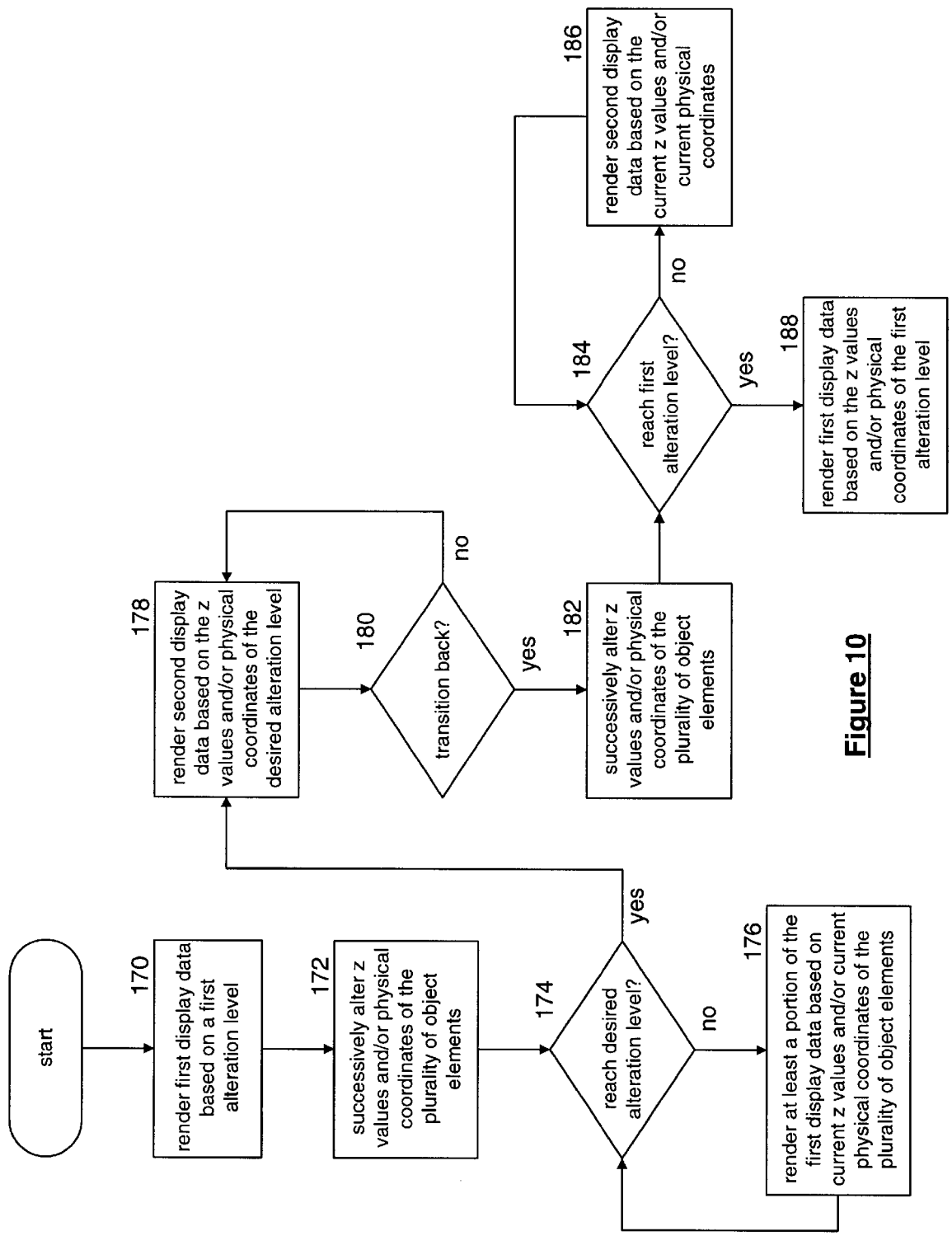
FIG. 10 illustrates a logic diagram of an alternate method for three-dimensional object/live video transitions in accordance with the present invention.

FIG. 10 illustrates a logic diagram of an alternative method of providing a transition between first display data and second display data, which may be performed by the processing unit 50 and/or video graphics engine 40. In addition, or in the alternative, the operational instructions that comprise the processing steps of FIG. 10 may be stored on a digital storage medium or embedded in the operation system. The process begins at step 170 where the first display data is rendered based on a first alteration level. Note that the plurality of object-elements constitute a display area. Further note that rendering involves the process of writing pixel data into the frame buffer for subsequent display. The process then proceeds to step 172 where the Z values and/or physical coordinates of the plurality of object-elements are successively altered. The process then proceeds to step 174 where a determination is made as to whether a desired alteration level has been reached. If not, the process proceeds to step 176 where at least a portion of the first display data is rendered into the frame buffer based on current Z values and/or current physical coordinates of a plurality of object-elements. Step 176 occurs for each successive alteration of the Z values and/or physical coordinates.

Once the desired alteration level is reached, the process proceeds to step 178 where the second display data is rendered into the frame buffer based on the Z values and/or physical coordinates of the desired alteration level. The process then proceeds to step 180 where a determination is made as to whether a transition back from the second data to the first display data is to occur. If so, the process proceeds to step 182 where the Z values and/or physical coordinates of the plurality of object-elements are successively altered.

The process then proceeds to step 184 where a determination is made as to whether the first alteration level has been reached. If not, the second display data is rendered into the frame buffer based on the current Z values and/or the current physical coordinates. Note that step 186 is repeated for each successive alteration of the Z values and/or physical coordinates. Once the first alteration level is reached, the process proceeds to step 188 where the first display data is rendered into the frame buffer based on the Z value and/or current physical coordinates of the first alteration level.

FIG. 11 illustrates a logic diagram of a method for providing a three-dimensional object on live video. Note that the processing steps of FIG. 11 may be implemented as operational instructions that are executable by the processing unit 50 and/or the video graphics engine 40. The process begins at step 190 where at least a portion of a back buffer is filled with a key color wherein the key color indicates presentation of the video. The filling of the back buffer with the key color may be done as a clearing of the back buffer. Note that capture buffer overlays back buffer, and hence the primary surface, such that, when the video is displayed, it is visible in the areas that contained in the key color.

The process then proceeds to step 192 where the three-dimensional object is written into the back buffer. The three-dimensional object and video, while in the back buffer, may be further processed by alpha blending, texture composite (i.e., the blending of two textures together), specular lighting, fogging, and/or bump mapping. Further note that the three-dimensional object is written into the back buffer based on parameters of three-dimensional object. Such parameters may be provided by the processing unit as part of the graphics data or may be included as integrated parameters of the video signal. Still further note that a plurality of three-dimensional objects may be written into the back buffer overlying the live video.

The process proceeds to step 194 where the back buffer is flipped thereby becoming the primary surface. In this position, the data that was just written into the back buffer is subsequently displayed with the three-dimensional object in a foreground viewing perspective with respect to the live video. The process then proceeds to step 196 where the parameters of the three-dimensional object are altered to provide three-dimensional animation.

FIG. 12 illustrates a logic diagram of an alternate method for providing three-dimensional object on live video. The processing steps of FIG. 12 may be stored as operational instructions in memory and executed by the processing unit 50 and/or the video graphics engine 40. The process begins at step 200 where at least a portion of a primary surface is filled with a key color. The key color indicates the areas in which the video is to be present. Having provided the key color, the primary surface is overlaid with a capture buffer that contains the video such that the video is at least partially viewable in at least a portion of the primary surface. The process proceeds to step 202 where a three-dimensional object is written into the primary surface in a foreground position with respect to the video. Note that a plurality of three-dimensional objects may be written into the primary surface. The process then proceeds to step 204 where the parameters of the three-dimensional object are altered to produce an animated three-dimensional object.

Figure 13:
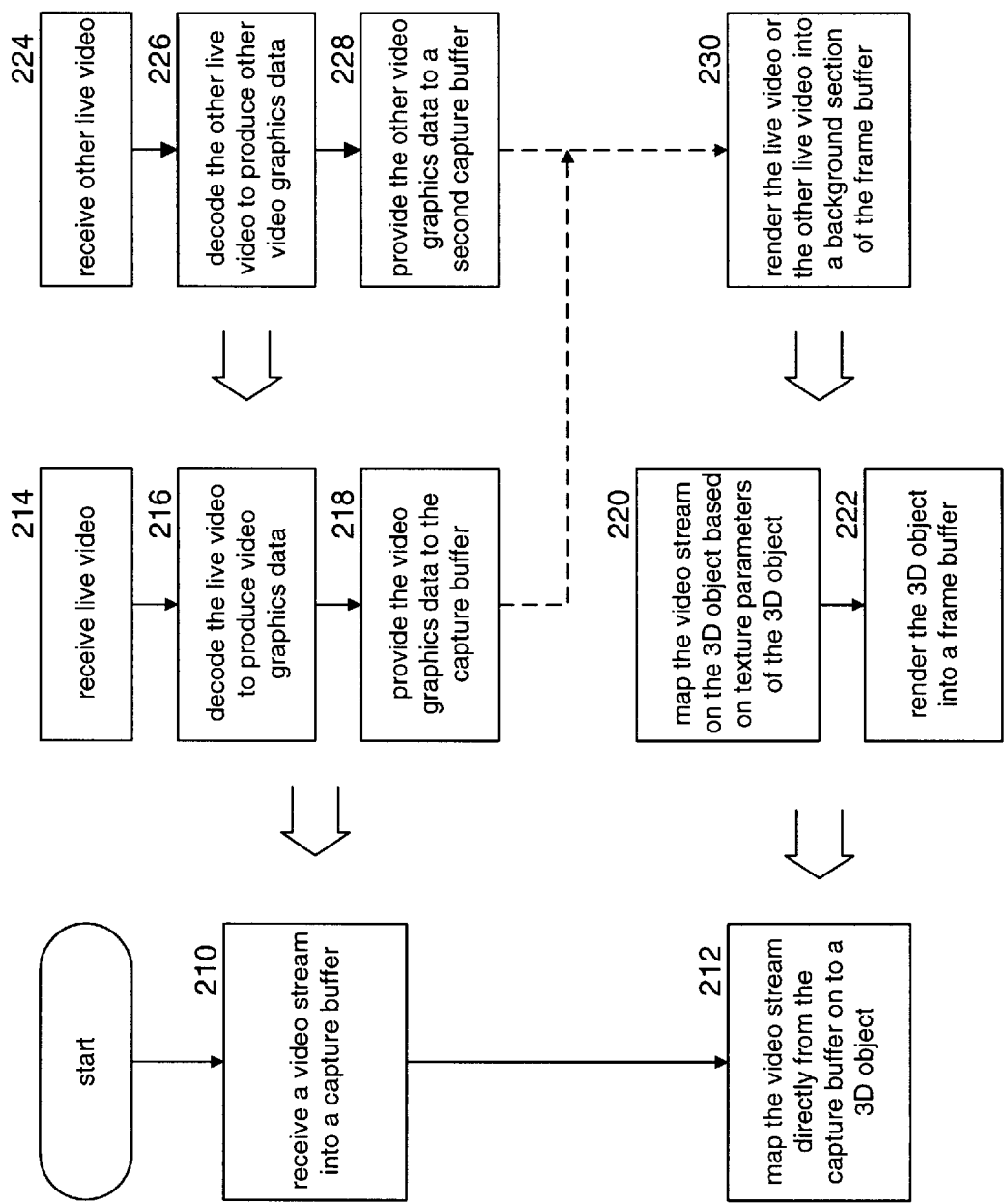
FIG. 13 illustrates a logic diagram of a method for providing live video on a three-dimensional object in accordance with the present invention.

FIG. 13 illustrates a logic diagram of a method for mapping a live video onto a three-dimensional object. The processing steps of FIG. 13 may be implemented as operational instructions that can be executed by the processing unit 50 and/or video graphics engine 40. The process begins at step 210 where a video stream of a live video is received into a capture buffer. This may be done as illustrated with steps 214 through step 218.

At step 214 the live video is received. The process then continues at step 216 where the live video is decoded to produce video graphics data. The process then begins at step 218 where the video graphics data is provided to the capture buffer. As an alternate process for receiving the video stream is illustrated with steps 224 through 228. At step 224 another live video stream is received. The process then proceeds to step 226 where the other live video is decoded to produce other video graphics data. The process then proceeds to step 228 where the other video graphics data is provided to a second capture buffer.

The process then continues at step 212 where the video stream is mapped directly from the capture buffer to the three-dimensional object. The mapping may be further based on environmental mapping (e.g., where the environment represents a face), bump mapping and/or terrain mapping. The process of step 212 may be further described with respect to the processing steps 220 and 222. At step 220, the video stream is mapped onto the three-dimensional object based on texture parameters of the three-dimensional object. The process then proceeds to step 222 where the three-dimensional object is rendered into a frame buffer. Note that the video data stored in the video capture buffer may be used to produce a plurality of perspective texture maps of the video stream (i.e., to produce MIP maps of the live video). The rendering of the three-dimensional object or a plurality of three-dimensional objects into the frame buffer may further include performing alpha-blending, texture composite, spectacular lighting, fogging and/or bump mapping. In addition, the frame buffer may include a primary surface and back buffer wherein the three-dimensional object is first rendered into the back buffer and then flipped into the primary surface.

As an alternate processing of step 212, step 230 provides rendering the live video or the other live video in a background section of the frame buffer. As such, one live video source may be mapped onto a three-dimensional object while another live video signal may be mapped into the background section. In this case, two video receiving circuits would be required as well as two video capture buffers.

FIG. 14 illustrates a logic diagram of an alternate method for mapping live video onto a three-dimensional object. Note that the processing steps may be implemented as operational instructions that are executable by the processing unit 50 and/or the video graphics engine 50. The process begins at step 240 where a video stream of live video is received into a capture buffer. The process then proceeds to step 242 where the capture buffer is accessed based on texture coordinates of the three-dimensional object. The process then proceeds to step 244 where the three-dimensional object is rendered with the live video thereon. Note that the live video was mapped directly from the capture buffer, which was functioning as a texture map, onto the three-dimensional object.

FIG. 15 illustrates a logic diagram of a method for providing a three-dimensional graphical user interface. Note that the processing steps of FIG. 15 may be implemented as operational instructions that are executable by the processing unit 50 and/or the video graphics engine 40. The process begins at step 250 where selection of an information thumbnail of a plurality of information thumbnails is detected. Note that the information thumbnail includes at least one of: a video image of live video, channel specific programming information, user options, vertical blanking interval information and/or information identifiers. Note that an information identifier functions as an index to more in-depth data and/or functions as a title. The process then proceeds to step 252 where detailed information is retrieved based on the selected thumbnail. The process then proceeds to step 254 where a three-dimensional object is provided in a foreground viewing perspective to the plurality of information thumbnails. The three-dimensional object is displaying the retrieved detailed information on at least one surface. Note that the information provided on a surface of the three-dimensional object may include live video, text data, animation data, and/or a combination thereof.

The process then proceeds to step 256 where a determination is made as to whether a navigational input has been received. If so, the process proceeds to step 258 where the three-dimensional object is reoriented based on the navigational input such that a different portion of the detailed information is emphasized. As such, the three-dimensional object may be rotated by the user to emphasize a different surface. The process then proceeds to step 260 where a determination as to whether a deactivation command has been received. If so, the three-dimensional object is deleted, as shown in step 262. If not, the process repeats at step 250.

Figure 16:
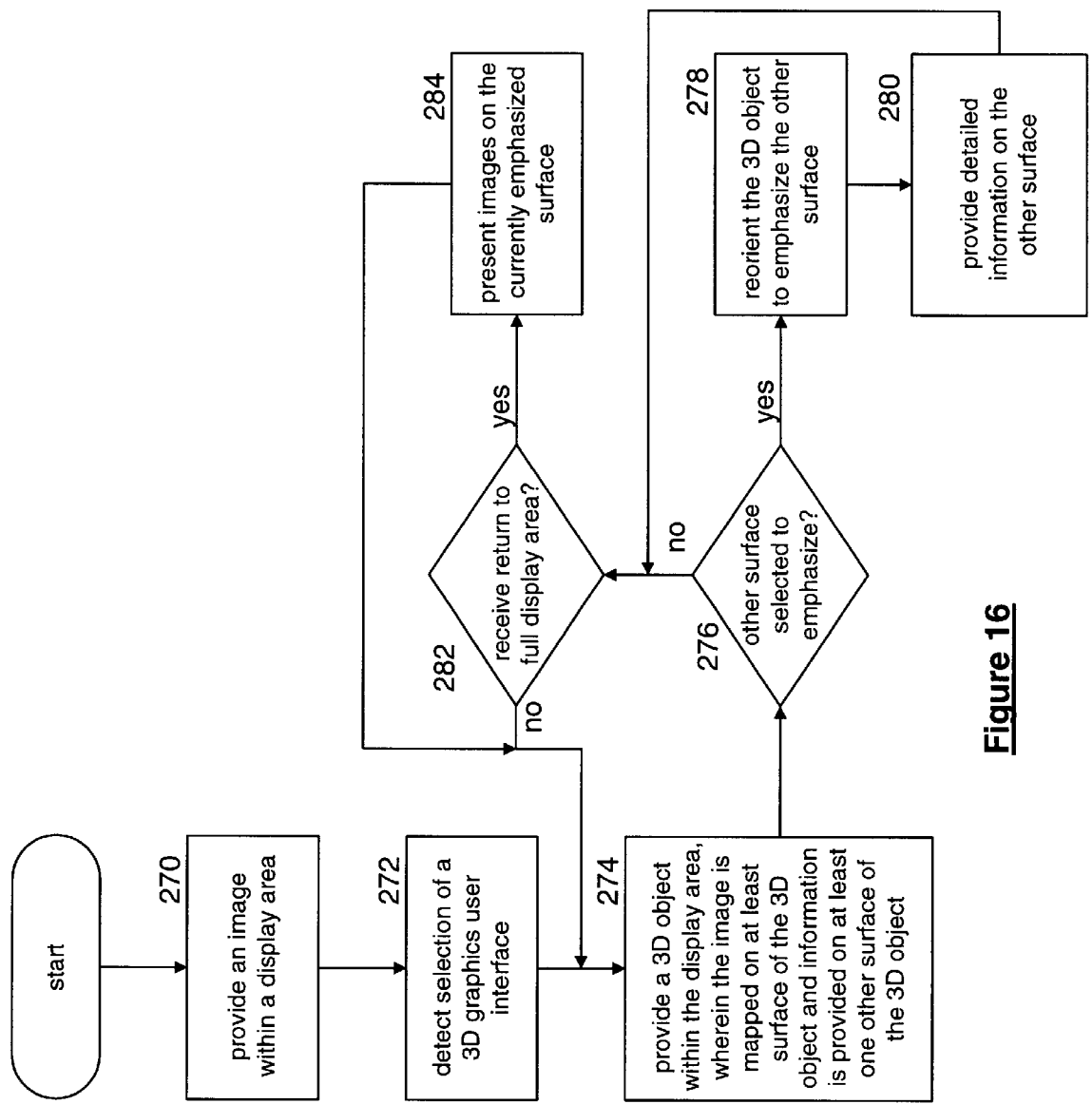
FIG. 16 illustrates a logic diagram of an alternate method for providing a three-dimensional graphical interface in accordance with the present invention.

FIG. 16 illustrates a logic diagram of an alternate method for providing a three-dimensional graphical user interface Note that the processing steps of FIG. 16 may be implemented as operational instructions that are executable by the processing unit 50 and/or the video graphics engine 40. The process begins at step 270 where an image is provided within a display area. The image may be a two-dimensional object, a three-dimensional object, live video and/or graphics data of an application.

The process then proceeds to step 272 where selection of a three-dimensional graphical user interface is detected. The process then proceeds to step 274 where a three-dimensional object is provided within the display area. The image that was being presented at step 270 is mapped onto at least one surface of the three-dimensional object and information regarding the image is provided on at least one other surface of the three-dimensional object.

The process then proceeds onto step 276 where a determination is made as to whether another surface is to be emphasized. Note that this may be done by a navigation input. If so, the process proceeds to step 278 where the three-dimensional object is reoriented to emphasize the other surface. Having done this, the process proceeds to step 280 to provide detailed information on the other surface. The process then proceeds to step 282 where a determination is made as to whether a return to full display area has been received. If so, the process proceeds to step 284 where images of the currently emphasized surface are presented on the full display. As such, the images that were initially being presented when the three-dimensional object was being selected may no longer be presented when returning to full screen operation. As such, whichever surface of the three-dimensional object is being emphasized when the return to full screen request is received will be the images presented in the full display area.

The preceding discussion has presented a method and apparatus for providing real time integration of live video and three-dimensional objects. By providing real time integration, three-dimensional graphical interfaces may be utilized over live video. In addition, live video may be mapped and/or rendered onto three-dimensional objects, and/or three-dimensional objects may be presented over live video.

What is claimed is:

1. A method for providing a three dimensional object on live video, the method comprises the steps of:
   a) filing at least a portion of a back buffer with a key color, wherein the key color indicates presentation of the live video;
   b) writing the three dimensional object into the back buffer; and
   c) flipping the back buffer to become a primary surface such that the three dimensional object is presented in a foreground viewing perspective with respect to the live video.

2. The method of claim 1, wherein step (a) further comprises overlaying the primary surface with a capture buffer that contains the live video such that the video is at least partially viewable in at least a portion of the primary surface that corresponds to at least a portion of the back buffer.

3. The method of claim 1 further comprises:
   altering parameters of the three dimensional object to produce a plurality of altered three dimensional objects; and
   repeating steps (a) through (c) for each of the plurality of altered three dimensional objects to produce an animated three dimensional object.

4. The method of claim 1 further comprises processing the three dimensional object and the live video while in the back buffer based on at least one of: alpha blending, texture composite, specular lighting, fogging, and bump mapping.

5. The method of claim 1 further comprises:
   receiving the live video as signal that includes live video content and integrate parameters of the three dimensional object.

6. The method of claim 1, wherein step (b) further comprises writing a plurality of three dimensional objects to the back buffer.

7. A method for providing a three dimensional object on video, the method comprises the steps of:
   a) filling at least a portion of a primary surface with a key color, wherein the key color indicates presentation of video; and
   b) writing the three dimensional object on to the primary surface such that the three dimensional object is presented in a foreground viewing perspective with respect to the video.

8. The method of claim 7, wherein step (a) further comprises overlaying the primary surface with a capture buffer that contains the video such that the video is at least partial viewable in the at least a portion of the primary surface.

9. The method of claim 7 further comprises:
   altering parameters of the three dimensional object to produce a plurality of altered three dimensional objects; and
   repeating steps (a) and (b) for each of the plurality of altered three dimensional objects to produce an animated three dimensional object.

10. The method of claim 7 further comprises processing the three dimensional object and the video based on at least one of: alpha blending, texture composite, specular lighting, fogging, and bump mapping.

11. The method of claim 7, wherein step (b) further comprises writing a plurality of three dimensional objects to the primary surface.

12. A video processing circuit comprises:

a processing module; and memory operably coupled to the processing module, wherein the memory includes operational instructions that cause the processing module to: (a) fill at least a portion of a back buffer with a key color, wherein the key color indicates presentation of the video; (b) write the three dimensional object into the back buffer; and (c) flip the back buffer to become a primary surface such that the three dimensional object is presented in a foreground viewing perspective with respect to the video.

13. The method of claim 11, wherein the memory further comprises operational instructions that cause the processing module to overlay the primary surface with a capture buffer that contains the video such that the video is at least partial viewable in at least a portion of the primary surface that corresponds to the at least a portion of the back buffer.

14. The method of claim 11, wherein the memory further comprises operational instructions that cause the processing module to:

alter parameters of the three dimensional object to produce a plurality of altered three dimensional objects; and repeat steps (a) through (c) for each of the plurality of altered three dimensional objects to produce an animated three dimensional object.

15. The method of claim 11, wherein the memory further comprises operational instructions that cause the processing module to processing the three dimensional object and the video while in the back buffer based on at least one of: alpha blending, texture composite, specular lighting, fogging, and bump mapping.

16. The method of claim 11, wherein the memory further comprises operational instructions that cause the processing module to write a plurality of three dimensional objects to the back buffer.

17. A video processing circuit comprises:

a processing module; and memory operably coupled to the processing module, wherein the memory includes operational instructions that cause the processing module to (a) fill at least a portion of a primary surface with a key color, wherein the key color indicates presentation of video; and (b) write the three dimensional object on to the primary surface such that the three dimensional object is presented in a foreground viewing perspective with respect to the video.

18. The video processing circuit of claim 17, wherein the memory further comprises operational instructions that cause the processing module to overlay the primary surface with a capture buffer that contains the video such that the video is at least partial viewable in the at least a portion of the primary surface.

19. The video processing circuit of claim 17, wherein the memory further comprises operational instructions that cause the processing module to:

alter parameters of the three dimensional object to produce a plurality of altered three dimensional objects; and repeat steps (a) and (b) for each of the plurality of altered three dimensional objects to produce an animated three dimensional object.

20. The video processing circuit of claim 17, wherein the memory further comprises operational instructions that cause the processing module to process the three dimensional object and the video based on at least one of: alpha blending, texture composite, specular lighting, fogging, and bump mapping.

21. The video processing circuit of claim 17, wherein the memory further comprises operational instructions that cause the processing module to write a plurality of three dimensional objects to the primary surface.

\* \* \* \* \*